(12) United States Patent
Yamamoto

(10) Patent No.: US 10,621,869 B2
(45) Date of Patent: Apr. 14, 2020

(54) DRIVING CONTROL DEVICE, DRIVING CONTROL METHOD, AND VEHICLE-TO-VEHICLE COMMUNICATION SYSTEM

(71) Applicant: NEC CORPORATION, Tokyo (JP)

(72) Inventor: Takeshi Yamamoto, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 194 days.

(21) Appl. No.: 15/557,906

(22) PCT Filed: Mar. 10, 2016

(86) PCT No.: PCT/JP2016/001336
§ 371 (c)(1),
(2) Date: Sep. 13, 2017

(87) PCT Pub. No.: WO2016/147623
PCT Pub. Date: Sep. 22, 2016

(65) Prior Publication Data
US 2018/0061236 A1 Mar. 1, 2018

(30) Foreign Application Priority Data
Mar. 18, 2015 (JP) ................................ 2015-054525

(51) Int. Cl.
*G08G 1/00* (2006.01)
*G08G 1/16* (2006.01)
(Continued)

(52) U.S. Cl.
CPC ............ *G08G 1/162* (2013.01); *B60R 21/00* (2013.01); *G05D 1/0212* (2013.01); *G08G 1/09* (2013.01);
(Continued)

(58) Field of Classification Search
None
See application file for complete search history.

(56) References Cited

U.S. PATENT DOCUMENTS 6,873,911 B2 * 3/2005 Nishira .................... B60T 7/16
340/436
6,882,287 B2 * 4/2005 Schofield ............... B60Q 1/346
340/903
(Continued)

FOREIGN PATENT DOCUMENTS

JP 10-105880 A 4/1998
JP 11-328597 A 11/1999
(Continued)

OTHER PUBLICATIONS

Communication dated Nov. 19, 2018, from European Patent Office in counterpart application No. 16764455.8.
(Continued)

*Primary Examiner* — Jonathan M Dager
(74) *Attorney, Agent, or Firm* — Sughrue Mion, PLLC

(57) ABSTRACT

By performing an actual traveling operation after vehicles communicate with each other regarding a safety check by vehicle-to-vehicle communication in advance, the present invention makes it possible to smoothly and safely change lanes or merge when a vehicle is changing lanes or merging by automatic driving. A driving control device that controls the driving of a vehicle is provided with: a sensor unit that detects vehicles present around a vehicle A vehicle-mounted communication device that transmits and receives information including position information to/from vehicle-mounted communication devices that are mounted to vehicles around the vehicle And maintains said information as a surrounding communication device table; a travel determination unit for determining travel control for the vehicle on the basis of the detection result of the sensor unit and the surrounding (Continued)

communication device table of the vehicle-mounted communication device; and a travel control unit that controls the travel of the vehicle on the basis of the result determined by the travel determination unit. When the vehicle is changing lanes, the sensor unit verifies whether a following linearly traveling vehicle is present in the lane that is the lane change destination. When a following linearly traveling vehicle is present in the lane that is the lane change destination, the vehicle-mounted communication device transmits information requesting a lane change to the following linearly traveling vehicle.

16 Claims, 9 Drawing Sheets

(51) Int. Cl.
    G08G 1/09      (2006.01)
    B60R 21/00     (2006.01)
    G05D 1/02      (2020.01)
(52) U.S. Cl.
    CPC ........... *G08G 1/16* (2013.01); *G08G 1/167*
        (2013.01); *G05D 1/0253* (2013.01); *G05D*
        *1/0257* (2013.01); *G05D 1/0278* (2013.01);
        *G05D 2201/0213* (2013.01)

(56) References Cited

U.S. PATENT DOCUMENTS

| | | | | |
|---|---|---|---|---|
| 8,428,843 | B2* | 4/2013 | Lee | B62D 15/025 180/282 |
| 8,604,967 | B2* | 12/2013 | Oh | G08G 1/163 340/903 |
| 8,874,342 | B2* | 10/2014 | Noda | G08G 1/167 340/438 |
| 8,914,181 | B2 | 12/2014 | Essame et al. | |
| 9,092,987 | B2* | 7/2015 | Bone | G08G 1/167 |
| 9,147,353 | B1* | 9/2015 | Slusar | G09B 19/167 |
| 9,475,491 | B1* | 10/2016 | Nagasaka | B60W 30/16 |
| 9,550,528 | B1* | 1/2017 | Hakeem | B62D 15/025 |
| 9,669,872 | B2* | 6/2017 | Rebhan | B60Q 9/00 |
| 9,715,830 | B2* | 7/2017 | Jin | B60W 30/0956 |
| 9,718,473 | B2* | 8/2017 | Suzuki | B60W 30/16 |
| 9,776,641 | B2* | 10/2017 | Matsuno | B60W 50/0225 |
| 9,809,223 | B2* | 11/2017 | Watanabe | B60W 30/18163 |
| 9,896,129 | B2* | 2/2018 | Baek | B62D 15/0255 |
| 9,928,746 | B1* | 3/2018 | MacNeille | G08G 1/0133 |
| 10,065,643 | B2* | 9/2018 | Ito | B60W 50/0097 |
| 10,089,876 | B1* | 10/2018 | Ramasamy | G08G 1/162 |
| 10,156,845 | B1* | 12/2018 | Greenberger | G05D 1/0088 |
| 10,163,351 | B2* | 12/2018 | Lei | G08G 1/162 |
| 10,229,600 | B2* | 3/2019 | So | G08G 1/167 |
| 10,286,907 | B2* | 5/2019 | Nishiguchi | B60W 30/162 |
| 2005/0015203 | A1* | 1/2005 | Nishira | B60W 50/16 701/301 |
| 2005/0256630 | A1* | 11/2005 | Nishira | B60K 31/0008 701/96 |
| 2006/0009910 | A1* | 1/2006 | Ewerhart | B60W 30/143 701/301 |
| 2009/0088925 | A1* | 4/2009 | Sugawara | B60W 30/12 701/41 |
| 2012/0004835 | A1* | 1/2012 | Sato | G08G 1/0104 701/118 |
| 2012/0123660 | A1* | 5/2012 | Kagawa | B60W 30/16 701/96 |
| 2013/0030687 | A1* | 1/2013 | Shida | G01S 5/0072 701/301 |
| 2013/0151412 | A1* | 6/2013 | Spahl | G06Q 20/40 705/44 |
| 2013/0184926 | A1* | 7/2013 | Spero | B62D 1/28 701/26 |
| 2013/0301406 | A1* | 11/2013 | Sakata | G08G 1/092 370/229 |
| 2013/0338868 | A1* | 12/2013 | Essame | B60W 30/18163 701/23 |
| 2013/0342368 | A1* | 12/2013 | Nathanson | G07C 5/008 340/903 |
| 2014/0104077 | A1* | 4/2014 | Engel | G08G 1/0962 340/901 |
| 2014/0195093 | A1* | 7/2014 | Litkouhi | B62D 15/0255 701/23 |
| 2014/0207325 | A1* | 7/2014 | Mudalige | B62D 15/025 701/26 |
| 2014/0343836 | A1* | 11/2014 | Maise | G08G 1/162 701/301 |
| 2015/0081202 | A1* | 3/2015 | Levin | G01C 21/3697 701/400 |
| 2015/0194055 | A1* | 7/2015 | Maass | B60W 50/14 340/905 |
| 2016/0076894 | A1* | 3/2016 | Choi | B60W 30/00 701/461 |
| 2016/0082971 | A1* | 3/2016 | Fuehrer | B60W 10/20 701/48 |
| 2016/0267796 | A1* | 9/2016 | Hiroma | G08G 1/22 |
| 2016/0278065 | A1* | 9/2016 | Kim | H04W 16/28 |
| 2016/0304097 | A1* | 10/2016 | Taira | G06K 9/00791 |
| 2017/0011633 | A1* | 1/2017 | Boegel | G05D 1/0293 |
| 2017/0076607 | A1* | 3/2017 | Linder | G08G 1/167 |
| 2017/0082452 | A1* | 3/2017 | Sumizawa | G01C 21/3658 |
| 2017/0225682 | A1* | 8/2017 | Schunk | B60W 30/165 |
| 2017/0287331 | A1* | 10/2017 | Laur | G08G 1/096725 |
| 2017/0330461 | A1* | 11/2017 | Caveney | B60W 30/0953 |
| 2018/0079419 | A1* | 3/2018 | Yamamoto | B60W 30/18163 |
| 2018/0188735 | A1* | 7/2018 | Sugawara | B60W 30/12 |
| 2018/0319403 | A1* | 11/2018 | Buburuzan | B62D 15/0255 |
| 2018/0322782 | A1* | 11/2018 | Engel | G08G 1/096741 |
| 2018/0370533 | A1* | 12/2018 | Sofra | B60W 30/10 |
| 2019/0014446 | A1* | 1/2019 | Gade | G08G 1/096725 |
| 2019/0025857 | A1* | 1/2019 | Luckevich | G05D 1/0295 |
| 2019/0043364 | A1* | 2/2019 | Jumpertz | G08G 1/096791 |
| 2019/0051159 | A1* | 2/2019 | Wang | G08G 1/0145 |
| 2019/0063929 | A1* | 2/2019 | Ohyama | G01C 21/32 |
| 2019/0075436 | A1* | 3/2019 | Yukizaki | G08G 1/09 |
| 2019/0088125 | A1* | 3/2019 | Park | H04W 4/40 |
| 2019/0088133 | A1* | 3/2019 | Alieiev | G08G 1/166 |
| 2019/0090264 | A1* | 3/2019 | Xiao | H04W 4/46 |
| 2019/0098470 | A1* | 3/2019 | Yukizaki | G08G 1/09 |
| 2019/0126942 | A1* | 5/2019 | Goto | B60W 50/14 |

FOREIGN PATENT DOCUMENTS

| | | |
|---|---|---|
| JP | 2005-050187 A | 2/2005 |
| JP | 2007-176355 A | 7/2007 |
| JP | 2008-168827 A | 7/2008 |
| JP | 2009-248892 A | 10/2009 |
| JP | 2012-159967 A | 8/2012 |
| JP | 2013-160560 A | 8/2013 |
| JP | 2014-075049 A | 4/2014 |
| JP | 2014-134897 A | 7/2014 |

OTHER PUBLICATIONS

International Search Report PCT/JP2016/001336 dated Apr. 12, 2016.

* cited by examiner

Fig.4

SURROUNDING VEHICLE TABLE OF VEHICLE A

| | ACQUIRED FROM SENSOR UNIT | | |
|---|---|---|---|
| | DIRECTION | RELATIVE DISTANCE | RELATIVE SPEED |
| DETECTED VEHICLE 1 | 135° | 15m | +10 km/h |
| DETECTED VEHICLE 2 | 150° | 50m | −5 km/h |
| DETECTED VEHICLE 3 | 200° | 45m | +20 km/h |
| DETECTED VEHICLE 4 | 0° | 40m | +5 km/h |

Fig.5

SURROUNDING COMMUNICATION DEVICE TABLE OF VEHICLE A

| | ACQUIRED FROM COMMUNICATION | | |
|---|---|---|---|
| | ID | POSITION | TIME |
| VEHICLE-MOUNTED COMMUNICATION DEVICE B | 123.456.78.90 | (X1, Y1, Z1) | 2015/02/24 10:26:51 |
| VEHICLE-MOUNTED COMMUNICATION DEVICE C | 123.456.78.91 | (X2, Y2, Z2) | 2015/02/24 10:26:50 |
| VEHICLE-MOUNTED COMMUNICATION DEVICE D | 123.456.78.92 | (X3, Y3, Z3) | 2015/02/24 10:26:53 |
| VEHICLE-MOUNTED COMMUNICATION DEVICE E | 123.456.78.93 | (X4, Y4, Z4) | 2015/02/24 10:26:52 |

DRIVING CONTROL DEVICE, DRIVING CONTROL METHOD, AND VEHICLE-TO-VEHICLE COMMUNICATION SYSTEM

CROSS REFERENCE TO RELATED APPLICATIONS

This application is a National Stage of International Application No. PCT/JP2016/001336 filed Mar. 10, 2016, claiming priority based on Japanese Patent Application No. 2015-054525 filed Mar. 18, 2015, the contents of all of which are incorporated herein by reference in their entirety.

TECHNICAL FIELD

The present invention relates a control device in an automatic driving system of a vehicle and especially relates to a device for realizing a safe and smooth automatic traveling of a vehicle by transmitting and receiving information via a vehicle-to-vehicle communication.

BACKGROUND ART

In recent years, an automatic driving technology of a vehicle is actively researched. Such automatic driving technology includes: a technique of recognizing an obstacle using an on-vehicle sensor and applying an automatic brake when a crash is possible and; a technique of detecting a position/speed of surrounding vehicles and autonomously adjusting the vehicle speed to keep the inter-vehicular distance with a preceding vehicle constant and the automatic driving technology is realized in a part of vehicles.

In future, to realize more high levels of automatic traveling, not only the adjustment for keeping the vehicle speed and the inter-vehicular distance on the same lane, but also a travel control when a vehicle changes a lane, joins/divides to/from a lane, and turns right or left is needed. When the change of the lanes and the joining/dividing to/from a lane are performed, especially it is needed to ensure the safety and the smoothness of the traffic stream.

In a conventional travel control when a vehicle changes the lane, joins/divides to/from a lane, and turns right or left, drivers use a visual contact and a blinker to recognize each other and accordingly a timing to change the lanes and join/divide to/from a lane is adjusted. In the automatic driving technology, it is needed to automatically and smoothly perform the control which is the same as the operations of the driver.

However, a real traffic environment is complicated, and it is very difficult to decide the timing to change the lanes and join/divide to/from a lane only with the on-vehicle sensor such as a camera and a radar. This is because the travel control of an own-vehicle is largely varied depending on an unpredictable traveling behavior of vehicles around the own-vehicle.

Then, in addition to the peripheral recognition with the on-vehicle sensor, it is proposed to collect information around the vehicle using the vehicle-to-vehicle communication or the road-to-vehicle communication technique. For example, PTL 1 discloses a drive assist method for performing the vehicle-to-vehicle communication between the joining vehicle which is traveling on the joining road and the vehicle traveling on the main road and determining whether to change the lanes based on the times needed for the joining vehicle to arrive at a junction. (Japanese Unexamined Patent Publication No. 11-328597)

CITATION LIST

Patent Literature

[PTL 1] Japanese Unexamined Patent Publication No. 11-328597 [PTL 2] Japanese Unexamined Patent Publication No. 2007-176355

[PTL 3] Japanese Unexamined Patent Publication No. 10-105880

[PTL 4] Japanese Unexamined Patent Publication No. 2008-168827

[PTL 5] Japanese Unexamined Patent Publication No. 2014-075049

SUMMARY OF INVENTION

Technical Problem

PTL 1 discloses, in the drive assist method, a driving control for improving the reliability of functions to detect the vehicle or the obstacle using the road sensor and the on-vehicle sensor by concurrently using the vehicle-to-vehicle communication and the road-to-vehicle communication.

In the drive assist method disclosed in PTL 2, pieces of information on the position and the speed are transmitted and received among vehicles by broadcast to grasp the position and the speed of the vehicles around the own-vehicle and such information is used for the driving control.

However, the vehicle-to-vehicle/road-to-vehicle communications disclosed in PTL 1 and PTL 2 merely serve to improve the detecting function of the sensor which recognizes the vehicles around the own-vehicle. A specific study for the safety check technique as a mutual recognition is insufficient between the vehicle traveling on the main road and the vehicle which intends to change the lanes when a vehicle changes the lanes, joins/divides to/from a lane, and turns right or left. In PTLs 3, 4, and 5 also, a specific study for the safety check technique as a mutual recognition is insufficient between the vehicle traveling on the main road and the vehicle which intends to change the lanes when a vehicle changes the lanes, joins/divides to/from a lane, and turns right or left.

The present invention is made in view of the above described problems, and an object of the present invention is to provide a driving control method and a device which allow vehicles to smoothly and safely change the lane or join to the lane by communicating among the vehicles in advance for safety check via the vehicle-to-vehicle communication and then performing the actual traveling operation when the vehicle changes the lane or joins to the lane by the automatic traveling.

Solution to Problem

A driving control device according to an aspect of the present invention is a driving control device for controlling driving of a vehicle, and the driving control device comprises: a sensor unit that detects a surrounding vehicle of an own-vehicle; a vehicle-mounted communication device that mutually transmits and receives, to/from a vehicle-mounted communication device mounted on the surrounding vehicle of the own-vehicle, information including position information and maintains the information in a surrounding communication device table; travel determination means that determines a travel control of the own-vehicle based on a detection result of the sensor unit and the surrounding communication device table of the vehicle-mounted communication device; and travel control means that controls traveling of the own-vehicle based on a result obtained by a determination made by the travel determination means; wherein when the own-vehicle changes a lane, the sensor unit verifies whether a following linearly traveling vehicle is present on a change destination lane; and if the following linearly traveling vehicle is present on the change destination lane, the vehicle-mounted communication device transmits, to the following linearly traveling vehicle, information on a lane change request.

A driving control method according to another aspect of the present invention is a driving control method for controlling driving of a vehicle when a lane is changed, and the driving control method comprises: maintaining, in a surrounding vehicle table, position information of a surrounding vehicle detected by a sensor unit mounted on an own-vehicle; mutually transmitting and receiving information including an identification number and the position information between a vehicle-mounted communication device mounted on the own-vehicle and a vehicle-mounted communication device mounted on the surrounding vehicle of the own-vehicle and maintaining the information in a surrounding communication device table; verifying whether a following linearly traveling vehicle is present from the surrounding vehicle table and the surrounding communication device table and when the following linearly traveling vehicle is present on a change destination lane, transmitting, to the following linearly traveling vehicle, information on a lane change request; and performing a lane change after the vehicle-mounted communication device receives, from the following linearly traveling vehicle, a reply to acknowledge the lane change.

A vehicle-to-vehicle communication system according to still another aspect of the present invention is a vehicle-to-vehicle communication system for performing a communication among moving vehicles, wherein: when a lane is changed, position information of a surrounding vehicle detected by a sensor unit mounted on an own-vehicle is maintained in a surrounding vehicle table; information including an identification number and the position information is mutually transmitted and received between a vehicle-mounted communication device mounted on the own-vehicle and a vehicle-mounted communication device mounted on the surrounding vehicle of the own-vehicle and the information is maintained in a surrounding communication device table; whether a following linearly traveling vehicle is present is verified from the surrounding vehicle table and the surrounding communication device table and if the following linearly traveling vehicle is present on a change destination lane, information on a lane change request is transmitted to the following linearly traveling vehicle; and a lane change is performed after the vehicle-mounted communication device receives, from the following linearly traveling vehicle, a reply to acknowledge the lane change by unicast.

Advantageous Effects of Invention

With this configuration, it is possible to provide the driving control method and the device which allow the vehicle to smoothly and safely change the lane or join to the lane by positively communicating among the vehicles in advance for safety check and then performing the traveling operation when the vehicle changes the lane or joins to the lane by the automatic traveling.

BRIEF DESCRIPTION OF DRAWINGS

FIG. 4 illustrates the surrounding vehicle table according to the present invention.

FIG. 5 illustrates the surrounding communication device table according to the present invention.

DESCRIPTION OF EMBODIMENTS

Figure 1:
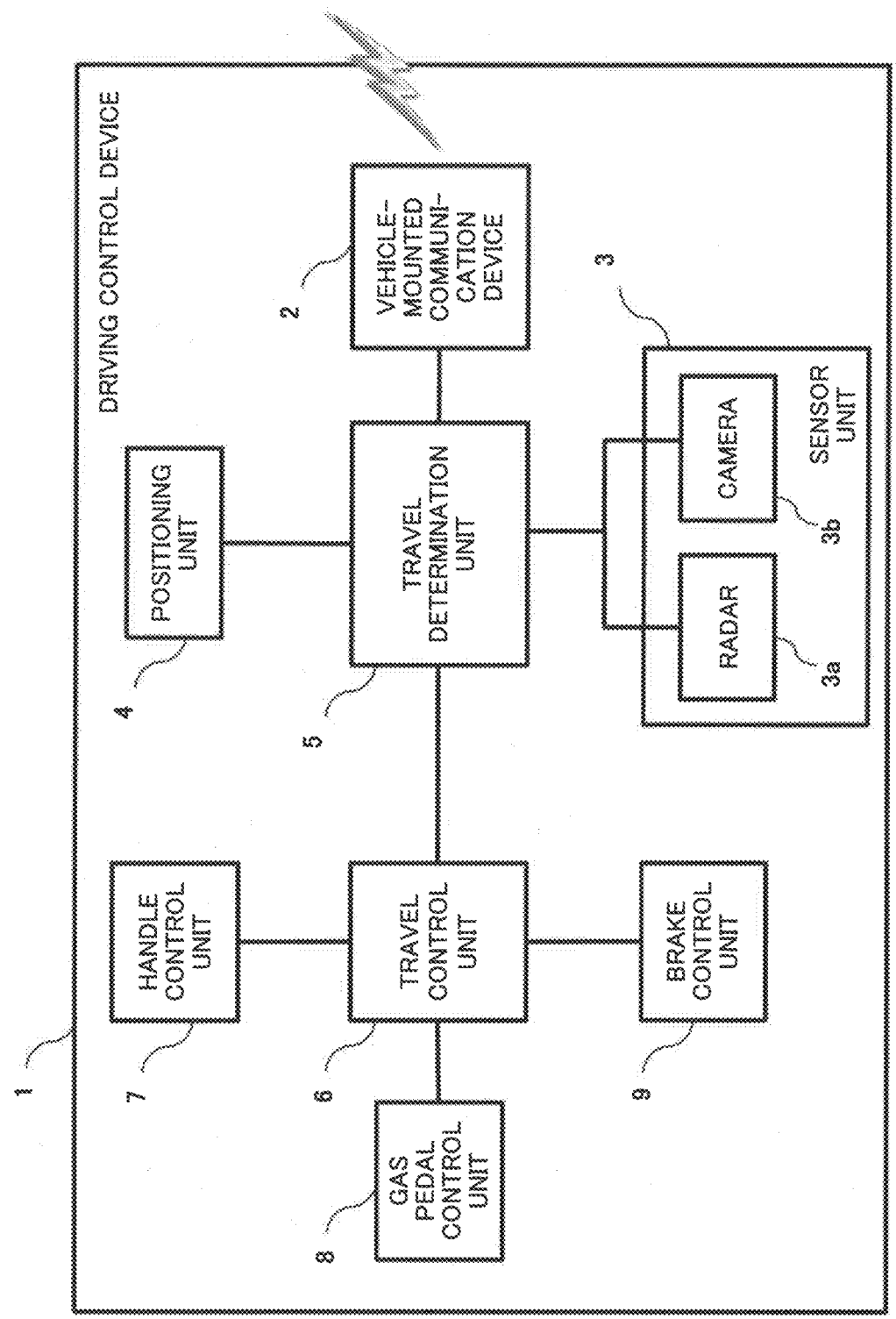
FIG. 1 is a block diagram of a driving control device according to the present invention.

Hereinafter, a configuration of the driving control device according to the present invention will be described with reference to the drawings. FIG. 1 is a block diagram of the driving control device according to the present invention. A driving control device 1 according to the exemplary embodiments of the present invention includes a vehicle-mounted communication device 2, a sensor unit 3, a positioning unit 4, a travel determination unit 5, and a travel control unit 6. The sensor unit 3 includes a radar 3a and a camera 3b.

The vehicle-mounted communication device 2 performs a bidirectional wireless communication with a roadside communication device or another vehicle-mounted communication device which is present around the own-vehicle. The vehicle-mounted communication device 2 receives data via the vehicle-to-vehicle communication or the road-to-vehicle communication and then supplies the data to the travel determination unit 5. The travel determination unit 5 recognizes a traveling environment around the own-vehicle based on the data received by the vehicle-mounted communication device 2.

Figure 2:
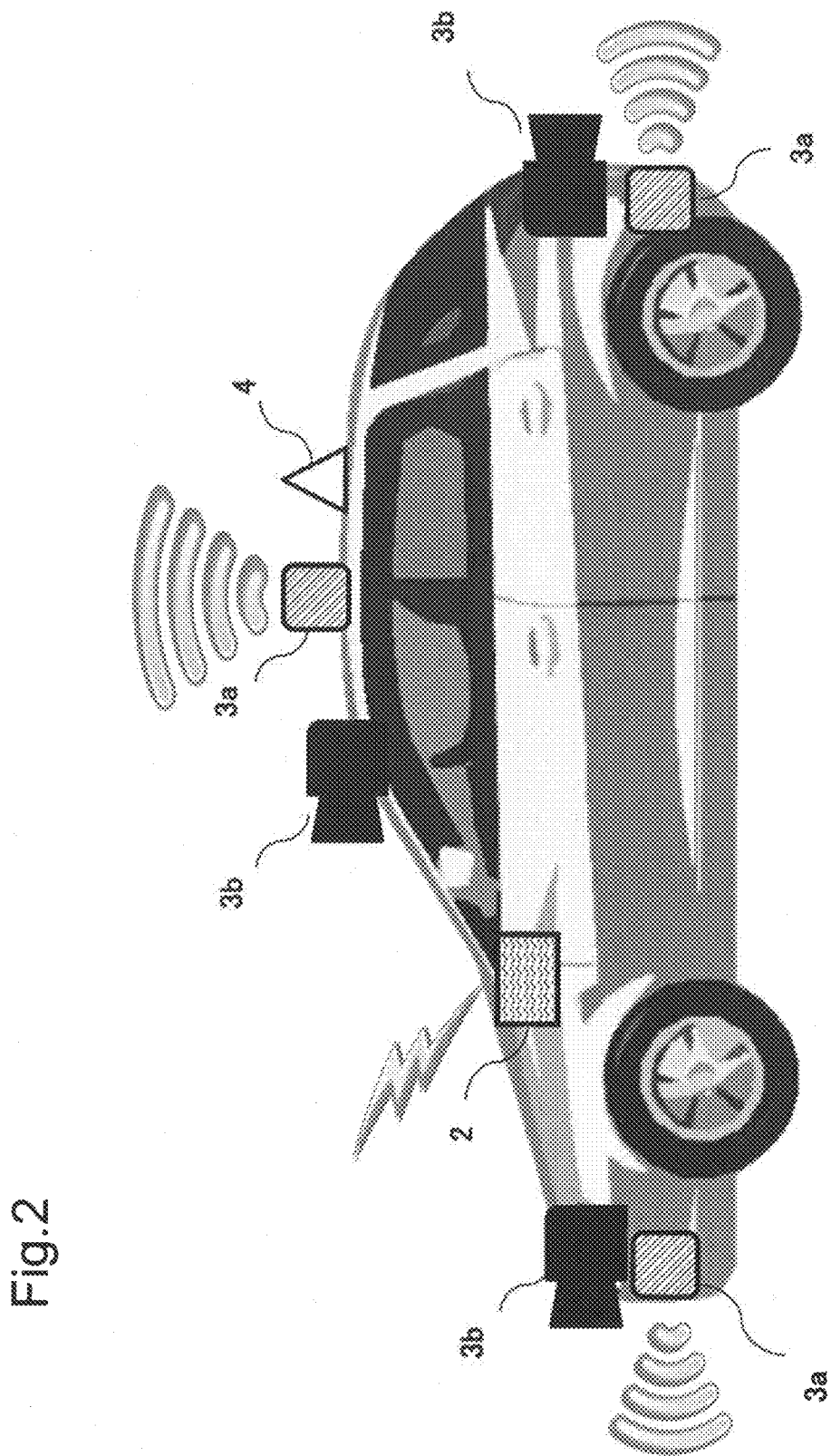
FIG. 2 is an example of a mounted sensor of the driving control device according to the present invention.

The sensor unit 3 includes a radar 3a and a camera 3b which are mounted on a predetermined position of the vehicle body. FIG. 2 illustrates an example of a mounted sensor in the vehicle body of the driving control device according to the present invention.

The radar 3a is a millimeter-wave radar located in front of the radiator grill of the vehicle or a laser radar located at a ceiling, and based on a time and an angle needed for receiving a reflective wave of a signal transmitted from an antenna of the radar, measures a relative distance, a relative speed, and direction between the own-vehicle and the detected object. Determination as to whether the detected object is the traveling vehicle or the stationary object is made based on the camera image and the calculation of the relative speed between the speeds of the own-vehicle and the detected object.

The camera 3b is an optical camera or an infrared camera such as a CCD and a CMOS and is located in the vicinity of the vehicle body, takes a photograph of the circumference of the vehicle and recognizes the surrounding object. The signal outputted from the sensor unit 3 is supplied to the travel determination unit 5. Through the detection signals of the sensor unit 3, the travel determination unit 5 detects the traveling vehicle or the obstacle around the own-vehicle.

The positioning unit 4, based on the signals transmitted from GPS satellites, acquires a current position of the vehicle. The signals outputted from the positioning unit 4 are supplied to the travel determination unit 5.

The travel determination unit 5 is configured by a microcomputer and the like. The travel determination unit 5, based on the traveling environment around the own-vehicle obtained by the vehicle-mounted communication device 2, the sensor unit 3, the positioning unit 4 and the like, calculates the crash possibility or the inter-vehicular distance with the surrounding vehicle and generates a control signal for a traveling speed and a steering direction so that the own-vehicle can safely travel.

The travel control unit 6 controls traveling of the vehicle body. Further, the travel control unit always detects the current position and the vehicle speed of the own-vehicle and also outputs a control signal to each of the handle control unit 7, the gas pedal control unit 8, the brake control unit 9 and the like based on the control signal generated by the travel determination unit 5 for performing the autonomous traveling of the own-vehicle.

Hereinafter, operations of the driving control device are described.

Figure 3:
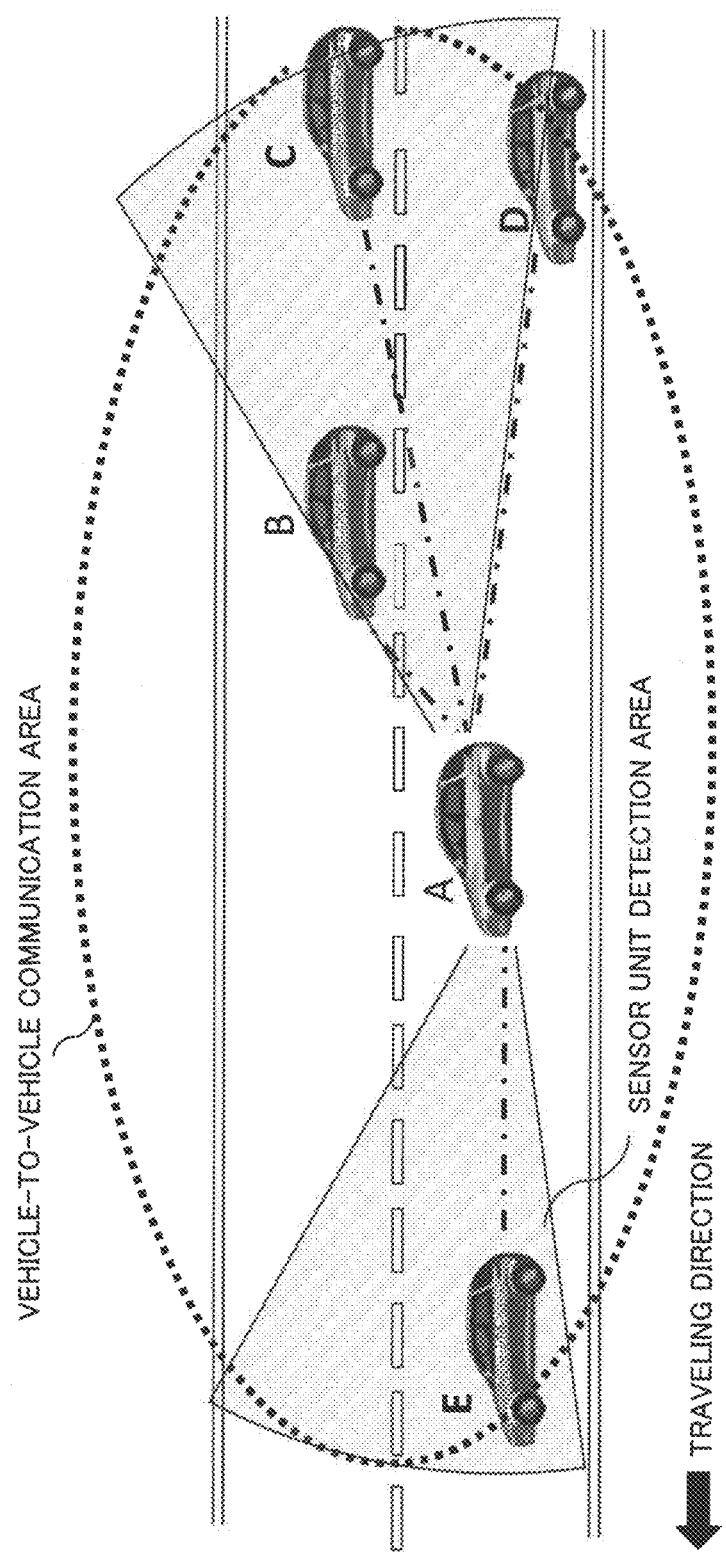
FIG. 3 is a diagram illustrating an image where vehicles around an own-vehicle are detected by the driving control device according to the present invention.

As illustrated in FIG. 3, the driving control device according to the present invention performs the automatic traveling while detecting surrounding vehicles with the sensor unit and the vehicle-mounted communication device. FIG. 3 illustrates an image where the surrounding vehicles are detected by the sensor unit and the vehicle-mounted communication device in the driving control device according to the present invention.

The sensor unit of the vehicle A of FIG. 3 detects side-by-side traveling vehicles (detected vehicles 1 to 4) that are present around an own-vehicle A as illustrated in FIG. 3. The sensor unit of the vehicle A measures the relative distance, the relative speed, and directions between the vehicle A and surrounding side-by-side traveling vehicles and maintains the information in the surrounding vehicle table. FIG. 4 illustrates the surrounding vehicle table.

The vehicle-mounted communication device of the vehicle A, in a range where radio waves reach as represented by a dot-dash-line in FIG. 3, performs the wireless bidirectional communication, i.e., the vehicle-to-vehicle communication with each of vehicle-mounted communication devices of the surrounding vehicles B, C, D, and E. Each vehicle-mounted communication device periodically transmits the identification data (hereinafter referred to as "ID") and the position information of the own terminal to surrounding terminals by broadcast. The ID is an IP address (Internet Protocol address) or the like for identifying an object to communicate.

The vehicle-mounted communication device of the vehicle A associates the ID and the position information received from other surrounding vehicle-mounted communication devices with a time and maintains the obtained information in the surrounding communication device table. FIG. 5 illustrates the surrounding communication device table.

The surrounding communication device table updates information each time a new signal is received. Further, each data may be deleted if no update is made for a predetermined time. The surrounding communication device table is supplied to the travel determination unit and used by the travel determination unit to grasp information on the surrounding vehicles.

The vehicle-mounted communication device may be configured to receive information relayed by the roadside communication device in addition to receiving, via a direct communication, information on position and the traveling speeds of the surrounding vehicles. Further, the vehicle-mounted communication device at a position where the radio waves from the transmitter, i.e., the vehicle-mounted communication device do not reach may receive a signal relayed by another vehicle-mounted communication device which is present within a range of the radio waves. Accordingly, it is possible to recognize the presence of the vehicle traveling outside of the range where the radio waves directly reach.

The travel determination unit, based on pieces of information in the surrounding vehicle table and the surrounding communication device table, calculates an optimum traveling schedule (traveling speed, steerage) in which the vehicle A can safely and efficiently travel. The travel control unit, based on the result, outputs the control signals to the handle control unit 7, the gas pedal control unit 8, the brake control unit 9 and the like of the vehicle A and controls traveling of the vehicle A.

Figure 6:
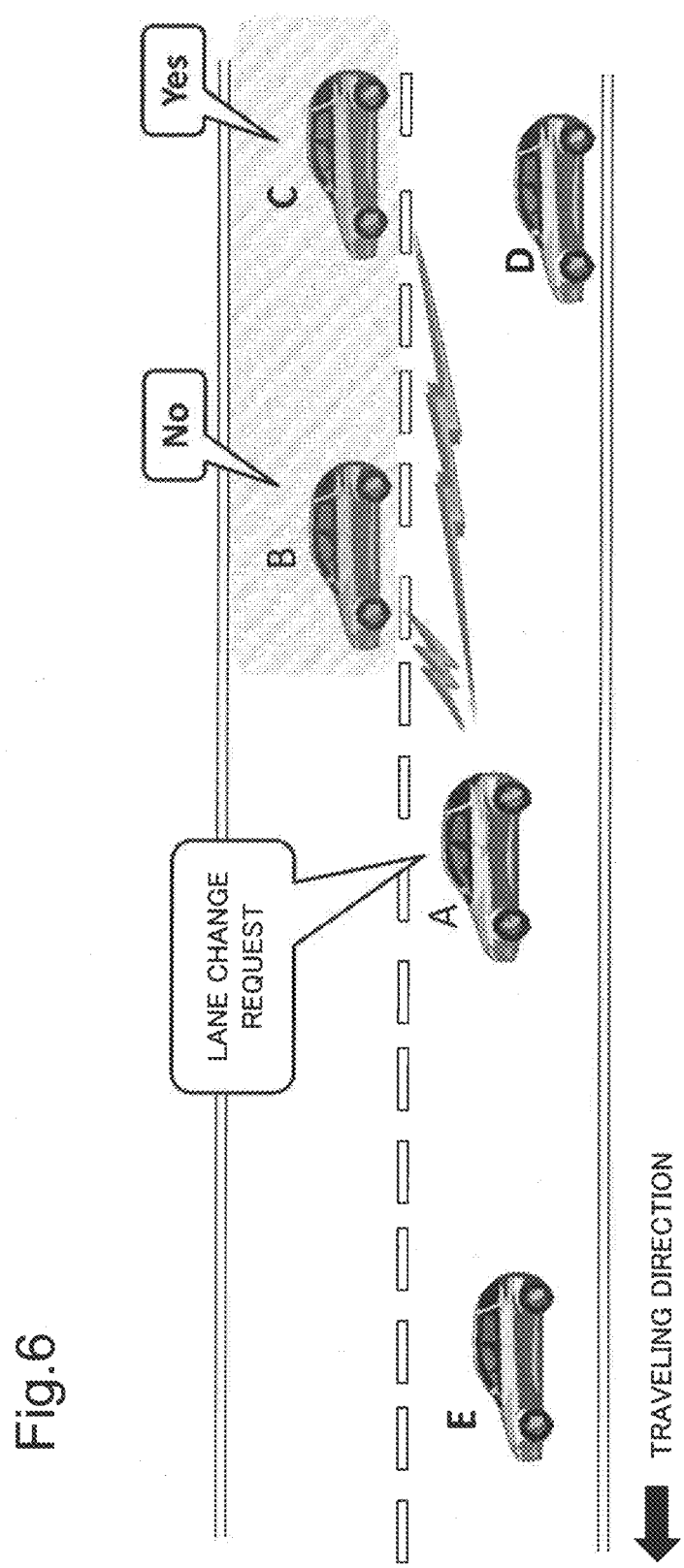
FIG. 6 is a diagram illustrating an image where a vehicle will change the lane according to the present invention.
Figure 7:
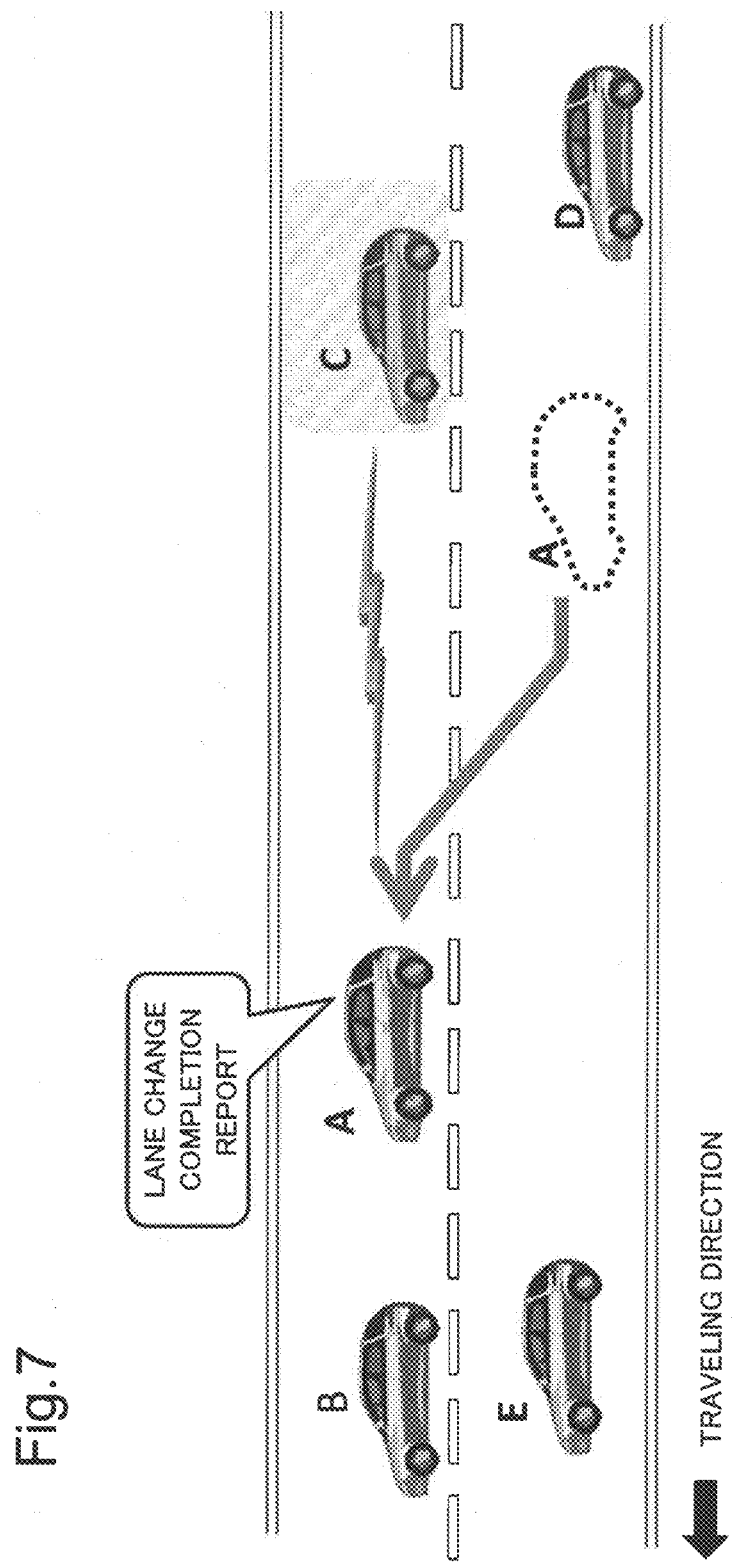
FIG. 7 is a diagram illustrating an image where a vehicle already changes the lane according to the present invention.
Figure 8:
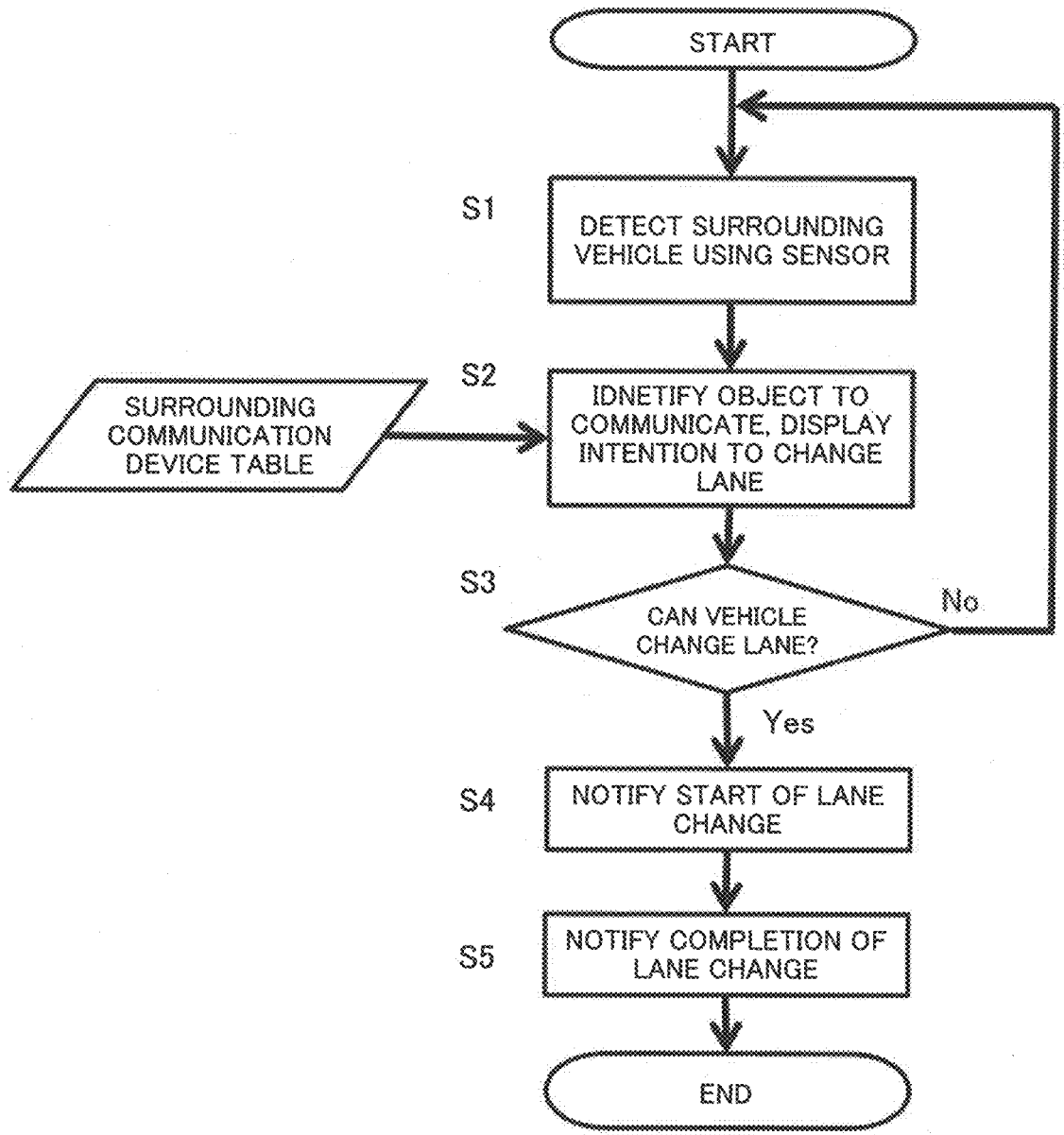
FIG. 8 is an operation flow chart of a lane changing vehicle A when changing the lane according to the present invention.

Hereinafter, operations when the lane is changed are described with reference to FIG. 6 to FIG. 8. FIG. 6 is a diagram illustrating an image where a vehicle will change the lane according to the present invention. FIG. 7 is a diagram illustrating an image where a vehicle already changes the lane according to the present invention.

First, processing performed by a lane changing vehicle A which changes the lanes is described. FIG. 8 is an operation flow chart of the lane changing vehicle A when changing the lanes.

In order to smoothly change the lanes, not only grasping how vehicles travel on a lane to which the own-vehicle intends to change the lane, grasping of the situation of the lane on which the own-vehicle is traveling are needed. Therefore, when the lanes need to be changed depending on the traveling route to the destination, the travel determination unit of the lane changing vehicle A verifies in advance whether the lanes can be safely changed.

The travel determination unit of the lane changing vehicle A, whenever the vehicle is traveling, recognizes the positions and the vehicle speeds of the own-vehicle and the surrounding vehicles based on the position of the own-vehicle obtained from the positioning unit, the vehicle speed obtained from the travel control unit, the surrounding communication device table obtained from the vehicle-mounted communication device and the surrounding vehicle table obtained from the sensor unit.

First, before start changing the lane, whether following linearly traveling vehicles are present on the change destination lane is verified. The presence of the following linearly traveling vehicles is verified using the sensor unit.

Next, when recognizing that the following linearly traveling vehicles are present on the change destination lane, the travel determination unit of the lane changing vehicle A identifies the following linearly traveling vehicles. The identification of each vehicle is based on the comparison between the position information (detected vehicles 1 to 4) which is obtained from the sensor unit and maintained in the surrounding vehicle table and the position information which is obtained from the vehicle-mounted communication device (vehicle-mounted communication devices B to D) and maintained in the surrounding communication device table and the comparison relationship. Regarding the recognition of the following linearly traveling vehicles, the travel determination unit of the lane changing vehicle A, identifies as the following linearly traveling vehicles, the vehicles B and C which travel side by side on the change destination lane, come to be a rearward of the lane changing vehicle A and come to have a relative distance which is equal to or below a predetermined threshold value.

The verification as to whether the vehicle can safely change the lane is based on, when, for example, a vehicle changes the lane, whether the inter-vehicular distance between the own-vehicle A and vehicles B and C on the change destination lane can be kept to be equal to or above a predetermined threshold value set in advance. When the inter-vehicular distance between the own-vehicle A and the vehicles B and C on the change destination lane is equal to or below the predetermined threshold value set in advance, the lane change is not possible, and alternatively only when the inter-vehicular distance is greater than the predetermined threshold value set in advance, the lane change is possible when the lane is changed (step S1).

Regarding the recognition of the following linearly traveling vehicle, the determination may be made by taking into consideration of the pieces of information such as a traveling direction, a traveling speed, and an acceleration in addition to the position information. Accordingly, the recognition accuracy can be improved.

When the lanes are determined to be changeable and the following linearly traveling vehicles B and C are identified, the travel determination unit selects the following linearly traveling vehicles B and C as objects to communicate, and supplies, to the vehicle-mounted communication device, a lane change request signal for requesting the lane change. The vehicle-mounted communication device transmits the lane change request signal using the pieces of position information of the following linearly traveling vehicles B and C identified from the surrounding communication device table by geocast. In this case, when the number of the following linearly traveling vehicles is large, requests may be transmitted at one time to a plurality of following linearly traveling vehicles. Alternatively, when the number of the following linearly traveling vehicles is small, the vehicle-mounted communication device may transmit the lane change request signals to each of the following linearly traveling vehicles B and C by unicast using the ID of the following linearly traveling vehicle B identified from the surrounding communication device table (step S2).

The travel determination unit of the lane changing vehicle A verifies, whether, from following linearly traveling vehicles B and C, the response to authorize the lane change request is received in response to the lane change request signal transmitted from the vehicle-mounted communication device.

When the travel determination unit determines that the response to authorize the lane change request is not received from both following linearly traveling vehicles B and C, steps S1 to S3 are repeated (step S3).

Figure 9:
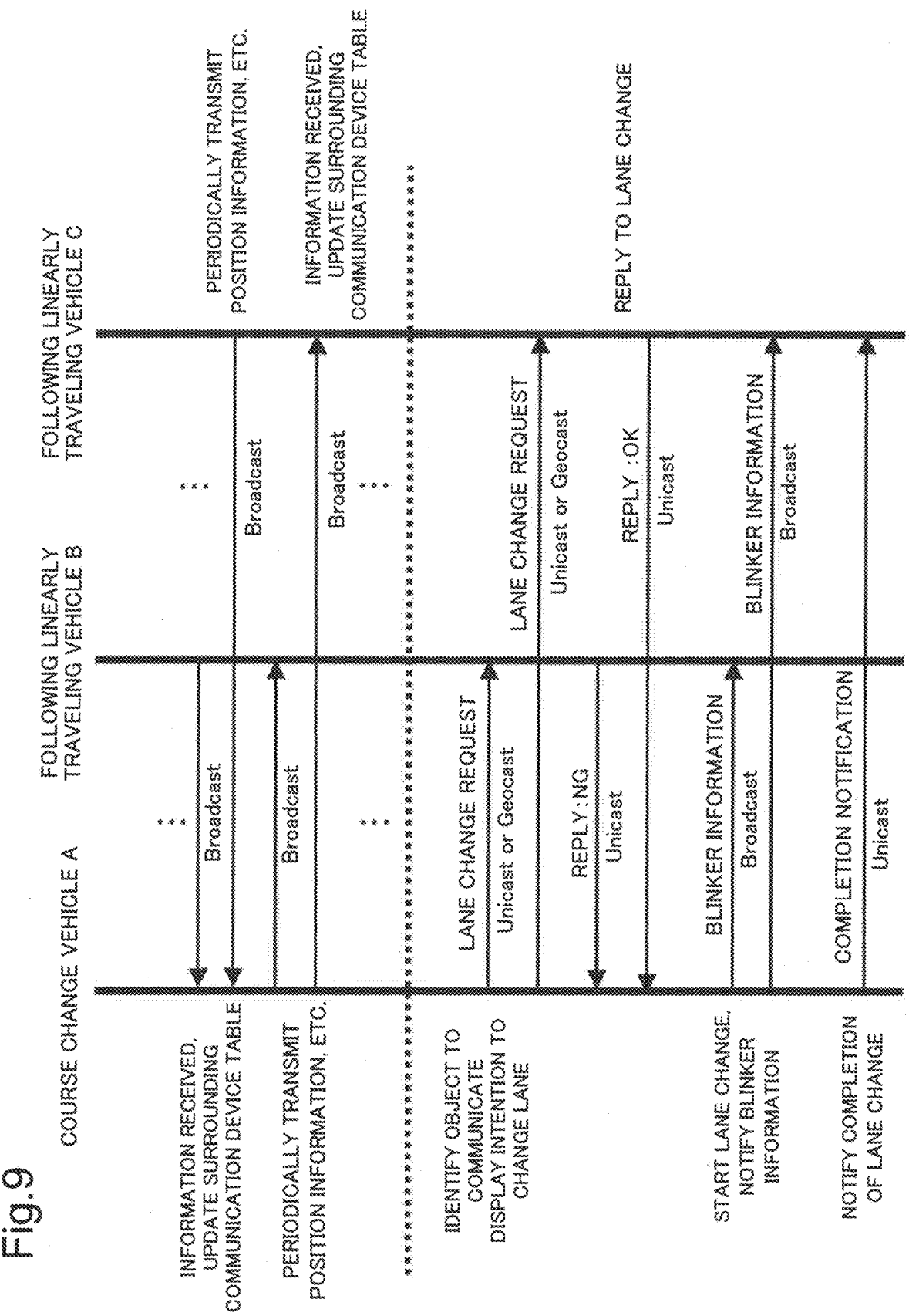
FIG. 9 is a sequence diagram of the vehicle-to-vehicle communication between a vehicle-mounted communication device of the lane changing vehicle A when changing the lane and vehicle-mounted communication devices of following linearly traveling vehicles B and C according to the present invention.

That is, when determining that the vehicle-mounted communication device receives, from the following linearly traveling vehicle B or C, the response to authorize the lane change request, the travel determination unit of the lane changing vehicle A instructs the travel control unit to change the lanes and the lane changing vehicle A actually changes the lanes. FIG. 9 is a sequence diagram illustrating the vehicle-to-vehicle communication between the vehicle-mounted communication device of the lane changing vehicle A and the vehicle-mounted communication devices of the following linearly traveling vehicles B and C when the lane is changed according to the present invention.

The lane changing vehicle A receives, from the following linearly traveling vehicle B, the response to reject the lane change request, and thus, the travel control unit performs the speed control such as the deceleration and waits until the following linearly traveling vehicle B passes. On the other hand, the lane changing vehicle A receives, from the following linearly traveling vehicle C, the response to authorize the lane change request, and thus, the travel control unit of the vehicle A starts the lane change operation immediately after the following linearly traveling vehicle B passes.

In starting the lane change operation, the travel determination unit of the lane changing vehicle A supplies, to the vehicle-mounted communication device, the blinker information signal for starting the lane change. The vehicle-mounted communication device transmits the blinker information signal to the surrounding vehicles B, C, D, and E in the broadcast format (step S4).

The travel determination unit of the lane changing vehicle A, after the lane change is completed, supplies a signal indicating the completion of the lane change to the vehicle-mounted communication device, and then, the vehicle-mounted communication device of the lane changing vehicle A transmits, to the following linearly traveling vehicle C, the signal indicating the completion of the lane change by unicast (step S5).

Next, processing performed by the following linearly traveling vehicles B and C which come to be joined sides by the lane change is described with reference to FIG. 9.

As same as the lane changing vehicle A, the following linearly traveling vehicles B and C also, whenever traveling, recognize the positions and the vehicle speeds of the own-vehicle and surrounding vehicles based on the position of the own-vehicle obtained from the positioning unit, the vehicle speed obtained from the travel control unit, the surrounding communication device table obtained from the vehicle-mounted communication device and information supplied from the sensor unit.

The travel determination units of the following linearly traveling vehicles B and C traveling side by side on the change destination lane recognize the presence of a vehicle which will join to the lane on which the own-vehicle is traveling by receiving, with the vehicle-mounted communication device, the lane change request from the surrounding vehicles.

Next, the travel determination units of the following linearly traveling vehicles B and C identify a vehicle which will join to the lane using the ID which is included in the received data on the lane change request.

The travel determination units of the following linearly traveling vehicles B and C predict, if the lane changing vehicle A joins to the lane, whether the following linearly traveling vehicles B and C can keep safe traveling, and based on the prediction result, transmit the response to the received lane change request.

Predicting whether the safe traveling can be kept is based on, in a case of a vehicle B, for example, when the lane changing vehicle A joins to the lane, the determination as to whether the inter-vehicular distances between the own-vehicle B and the lane changing vehicle A, and the own-vehicle B and the following linearly traveling vehicle C of the own-vehicle can be kept to be equal to or above a predetermined threshold value set in advance. when the inter-vehicular distance with vehicles in the vicinity of the own-vehicle is equal to or below the predetermined threshold value set in advance, the change of the lane is not possible, and alternatively, only when the inter-vehicular distance with vehicles in the vicinity of the own-vehicle is greater than the predetermined threshold value set in advance, the change of the lane is possible.

The travel determination units of the lane changing vehicles B and C supply, to the vehicle-mounted communication device, a signal indicating Yes when joining of the vehicle A to the lane is authorized and a signal indicating No when joining of the vehicle A to the lane is rejected. The vehicle-mounted communication device transmits, to the vehicle A, a response result, i.e., signal indicating Yes/No by unicast in response to the lane change request.

For example, the following linearly traveling vehicle B replies to the transmitter, i.e., the vehicle A to reject the lane change and performs the speed control such as acceleration when needed so that the vehicle A identified by the sensor unit can join to the lane without delay.

The following linearly traveling vehicle C replies, to the vehicle A, i.e., the transmitter to acknowledge the lane change and performs a speed control such as a deceleration to ensure a needed inter-vehicular distance so that the vehicle A identified by the sensor unit can safely join to the lane as needed, and accordingly, the crash is avoided.

The following linearly traveling vehicle C receives, with the vehicle-mounted communication device, a signal for notifying the completion of the lane change of the lane changing vehicle A by unicast, and returns to the usual autonomous travel control.

A plurality of exemplary embodiments of the present invention have been described, but the present invention is not construed to be limited to the above described exemplary embodiments, and is applicable to various exemplary embodiments and a combination thereof without departing from the scope of the present invention.

This application claims priority based on Japanese Patent Application No. 2015-054525 filed on Mar. 18, 2015, the disclosure of which is incorporated herein in its entirety.

REFERENCE SIGNS LIST

1 Driving control device
2 Vehicle-mounted communication device
3 Sensor unit
3a Radar
3b Camera
4 Positioning unit
5 Travel determination unit
6 Travel control unit
7 Handle control unit
8 Gas pedal control unit
9 Brake control unit

The invention claimed is:

1. A driving control device for controlling driving of a vehicle, the driving control device comprising:
  a sensor configured to
    detect a surrounding vehicle of an own-vehicle, and maintain position information of the detected surrounding vehicle in a surrounding vehicle table;
  a vehicle-mounted transceiver configured to mutually transmit and receive, to/from a vehicle-mounted transceiver mounted on the surrounding vehicle, information including position information and maintain the information in a surrounding transceiver table;
  a travel determinator configured to
    compare the position information that is obtained from the vehicle-mounted transceiver and maintained in the surrounding transceiver table with the position information maintained in the surrounding vehicle table, and
    identify, as a following linearly traveling vehicle, a vehicle that performs a lane change and includes an error that is equal to or below a predetermined threshold value, and determine a travel control of the own-vehicle; and
  a travel controller configured to
    control traveling of the own-vehicle based on a result obtained by a determination made by the travel determinator; wherein
    in the case where the own-vehicle changes a lane, the sensor verifies whether a following linearly traveling vehicle is present on a change destination lane; and
    if the following linearly traveling vehicle is present on the change destination lane, the vehicle-mounted transceiver transmits, to the following linearly traveling vehicle, information on a lane change request.

2. The driving control device according to claim 1, wherein the vehicle-mounted transceiver transmits information on the lane change request to an area of lane change destination where the following linearly traveling vehicle is present by geocast.

3. The driving control device according to claim 1, wherein: the vehicle-mounted transceiver mutually transmits and receives, with the vehicle-mounted transceiver mounted on the surrounding vehicle, data including the position information and identification data, and maintains the position information and the identification data as a set in the surrounding transceiver table;
  the travel determinator selects the identification data of the following linearly traveling vehicle identified from a table maintained by the vehicle-mounted transceiver; and
  the vehicle-mounted transceiver uses the identification data to transmit, to the following linearly traveling vehicle, information on the lane change request by unicast.

4. The driving control device according to claim 1, wherein the travel control unit performs the lane change after the vehicle-mounted transceiver receives a reply to acknowledge the lane change from the following linearly traveling vehicle by unicast.

5. The driving control device according to claim 1, wherein in the case where the lane is changed, the vehicle-mounted transceiver transmits information on the lane change to the surrounding vehicle by broadcast.

6. The driving control device according to claim 1, wherein in the case where the lane change is completed, the vehicle-mounted transceiver transmits, to the following linearly traveling vehicle, a notification of a completion of the lane change by unicast.

7. A driving control method for controlling driving of a vehicle in the case where a lane is changed, the driving control method comprising:
  maintaining, in a surrounding vehicle table, position information of a surrounding vehicle detected by a sensor mounted on an own-vehicle;
  mutually transmitting and receiving information including an identification number and the position information between a vehicle-mounted transceiver mounted on the own-vehicle and a vehicle-mounted transceiver mounted on the surrounding vehicle of the own-vehicle and maintaining the information in a surrounding transceiver table;

verifying whether a following linearly traveling vehicle is present from the surrounding vehicle table and the surrounding transceiver table and in the case where the following linearly traveling vehicle is present on a change destination lane, transmitting, to the following linearly traveling vehicle, information on a lane change request; and performing a lane change after the vehicle-mounted transceiver receives, from the following linearly traveling vehicle, a reply to acknowledge the lane change.

8. A vehicle-to-vehicle communication system for performing a communication among moving vehicles, wherein:

in the case where a lane is changed, position information of a surrounding vehicle detected by a sensor mounted on an own-vehicle is maintained in a surrounding vehicle table;

information including an identification number and the position information is mutually transmitted and received to/from a vehicle-mounted transceiver mounted on the surrounding vehicle of the own-vehicle by a vehicle-mounted transceiver mounted on the own-vehicle and the information is maintained in a surrounding transceiver table of the a vehicle-mounted transceiver mounted on the own-vehicle;

whether a following linearly traveling vehicle is present is verified from the surrounding vehicle table and the surrounding transceiver table by the a travel determinator and if the following linearly traveling vehicle is present on a change destination lane, information on a lane change request is transmitted to the following linearly traveling vehicle by the a vehicle-mounted transceiver mounted on the own-vehicle; and a lane change is performed by a travel controller after the vehicle-mounted transceiver receives, from the following linearly traveling vehicle, a reply to acknowledge the lane change by unicast.

9. The driving control device according to claim 1, wherein the vehicle-mounted transceiver transmits information on the lane change request to an area of lane change destination where the following linearly traveling vehicle is present by geocast.

10. The driving control device according to claim 1, wherein the travel controller performs the lane change after the vehicle-mounted transceiver receives a reply to acknowledge the lane change from the following linearly traveling vehicle by unicast.

11. The driving control device according to claim 2, wherein the travel control unit performs the lane change after the vehicle-mounted transceiver receives a reply to acknowledge the lane change from the following linearly traveling vehicle by unicast.

12. The driving control device according to claim 3, wherein the travel controller performs the lane change after the vehicle-mounted transceiver receives a reply to acknowledge the lane change from the following linearly traveling vehicle by unicast.

13. The driving control device according to claim 1, wherein the travel controller performs the lane change after the vehicle-mounted transceiver receives a reply to acknowledge the lane change from the following linearly traveling vehicle by unicast.

14. The driving control device according to claim 2, wherein the travel controller performs the lane change after the vehicle-mounted transceiver receives a reply to acknowledge the lane change from the following linearly traveling vehicle by unicast.

15. The driving control device according to claim 3, wherein the travel controller performs the lane change after the vehicle-mounted transceiver receives a reply to acknowledge the lane change from the following linearly traveling vehicle by unicast.

16. The driving control device according to claim 4, wherein the travel controller performs the lane change after the vehicle-mounted transceiver receives a reply to acknowledge the lane change from the following linearly traveling vehicle by unicast.

* * * * *